(12) United States Patent
Terrill et al.

(10) Patent No.: US 7,054,017 B2
(45) Date of Patent: May 30, 2006

(54) AVOIDING PRINTING DEFECTS

(75) Inventors: Jody Lee Terrill, Boise, ID (US); James Wyatt Lomas, Boise, ID (US)

(73) Assignee: Hewlett-Packard Development, L.P., Houston, TX (US)

( * ) Notice: Subject to any disclaimer, the term of this patent is extended or adjusted under 35 U.S.C. 154(b) by 899 days.

(21) Appl. No.: 10/135,665

(22) Filed: Apr. 30, 2002

(65) Prior Publication Data

US 2003/0202200 A1 Oct. 30, 2003

(51) Int. Cl.
  *G06F 15/00* (2006.01)
(52) U.S. Cl. .................. 358/1.14; 358/3.26; 382/112; 345/611
(58) Field of Classification Search .............. 382/112, 382/149; 399/8, 15; 358/1.14, 504; 347/14
See application file for complete search history.

(56) References Cited

U.S. PATENT DOCUMENTS

| | | | | |
|---|---|---|---|---|
| 4,453,166 A | 6/1984 | Enoto | .......................... | 346/1.1 |
| 4,500,893 A | 2/1985 | Sakura et al. | ................. | 346/76 |
| 4,583,116 A | 4/1986 | Hennig et al. | ................ | 358/75 |
| 4,595,935 A | 6/1986 | Brooks et al. | ................ | 346/76 |
| 5,033,378 A | 7/1991 | Ebihara | ....................... | 101/152 |
| 5,124,720 A | 6/1992 | Schantz | ....................... | 346/1.1 |
| 5,173,733 A | 12/1992 | Green | ......................... | 355/208 |
| 5,255,329 A * | 10/1993 | Tanimizu et al. | ........... | 382/112 |
| 5,625,703 A | 4/1997 | Okuda et al. | ............... | 382/112 |
| 5,699,451 A | 12/1997 | Birgmeir et al. | ............ | 382/167 |
| 5,732,306 A | 3/1998 | Wilczak, Jr. | .................. | 399/9 |
| 6,005,670 A | 12/1999 | Coleman | .................... | 358/1.9 |
| 6,074,790 A | 6/2000 | Venkateswar et al. | ........ | 430/30 |
| 6,231,160 B1 | 5/2001 | Glass | ......................... | 347/40 |
| 6,304,278 B1 | 10/2001 | Coleman | .................... | 347/110 |
| 6,341,020 B1 | 1/2002 | Rumph et al. | ............... | 358/1.9 |
| 6,449,385 B1 * | 9/2002 | Huber et al. | ................ | 382/112 |
| 6,538,759 B1 * | 3/2003 | Hiraishi et al. | ............ | 358/1.14 |
| 6,757,421 B1 * | 6/2004 | Kubo | ......................... | 382/149 |
| 6,862,414 B1 * | 3/2005 | Sampath et al. | .............. | 399/15 |
| 6,870,951 B1 * | 3/2005 | Cai | ............................ | 382/149 |
| 6,912,304 B1 * | 6/2005 | Aghajan | ..................... | 382/149 |
| 6,950,613 B1 * | 9/2005 | Fujimoto et al. | .............. | 399/8 |
| 2002/0097422 A1 * | 7/2002 | Matthews et al. | ......... | 358/1.14 |
| 2002/0171697 A1 * | 11/2002 | Gargir et al. | ................ | 347/14 |
| 2003/0081274 A1 * | 5/2003 | Yamamoto | ................. | 358/504 |
| 2003/0193684 A1 * | 10/2003 | Kendall et al. | ............ | 358/1.14 |

* cited by examiner

*Primary Examiner*—Kimberly Williams
*Assistant Examiner*—Ashish K. Thomas (57) ABSTRACT

Various systems and methods are provided for avoiding printing defects when printing documents. In one embodiment, a method is provided that identifies a printing defect on a hardcopy document, the printing defect being created by a printer, identifies a non-printed digital document affected by the printing defect, and, prevents a printing of the non-printed digital document affected by the printing defect.

34 Claims, 7 Drawing Sheets

AVOIDING PRINTING DEFECTS

BACKGROUND

Printers that are employed in the printing industry often include consumable parts that can wear over time or otherwise become damaged. For example, where digital offset presses are employed, such consumable parts may include, for example, liquid ink, photoelectric drums, fusers, transfer blankets, etc. If a consumable part is worn or damaged, the quality of the hardcopy documents that are printed often suffers. Specifically, the hardcopy documents may include one or more printing defects. If such is the case, an operator may have to replace the consumer part itself in order to continue printing without printing defects. This results in a loss of printing media that is wasted due to the printing defects, unwanted downtime, expensive part replacement, and less profit for the print vendor.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
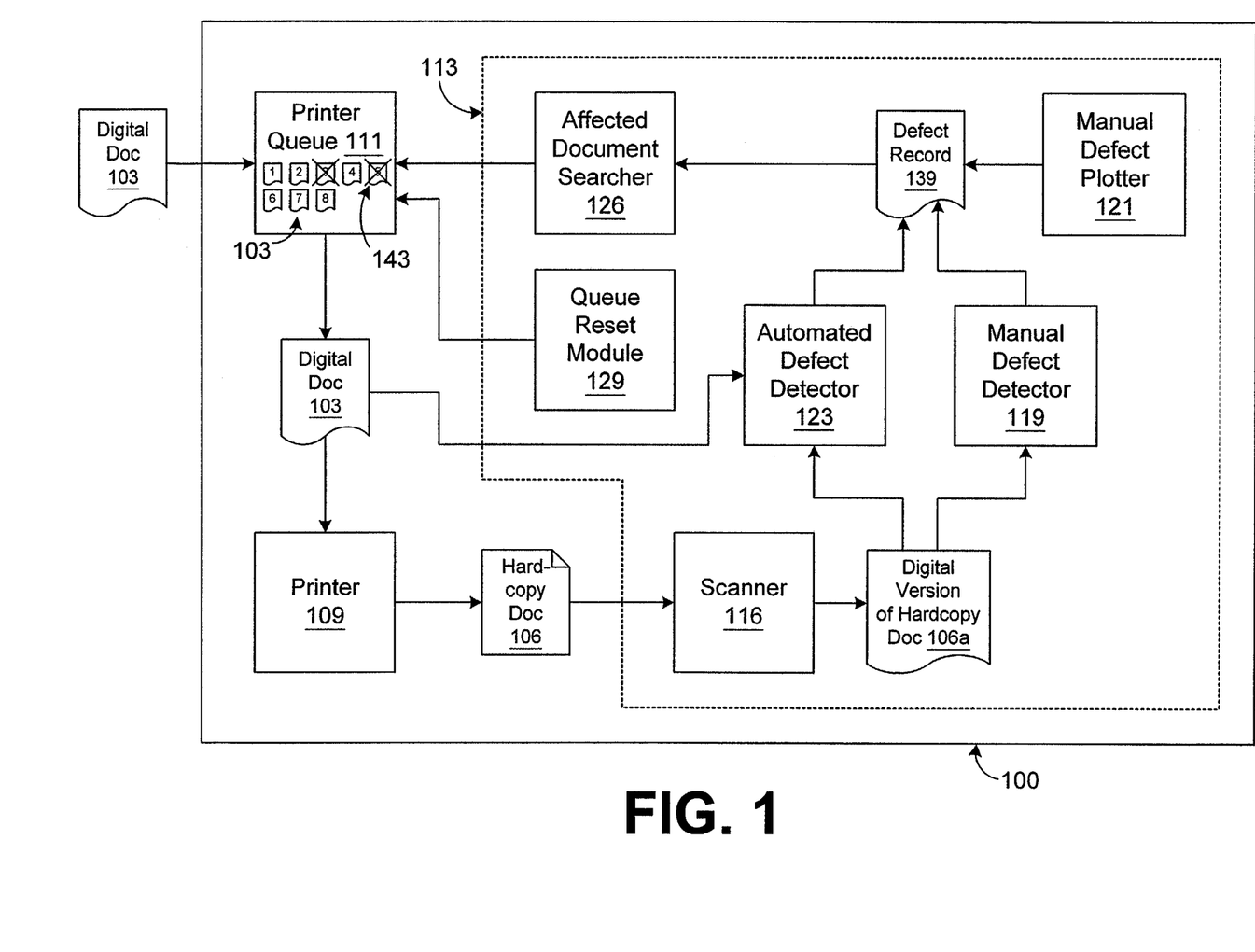
FIG. 1 is a functional block diagram of a printing system that includes a defect avoidance system according to an embodiment of the present invention.

With reference to FIG. 1, shown is a functional block diagram of an exemplary printing system 100 according to an embodiment of the present invention. As shown in FIG. 1, each block represents a module, object, or other grouping or encapsulation of underlying functionality as implemented in programming code. However, the same underlying functionality may exist in one or more modules, objects, or other groupings or encapsulations that differ from those shown in FIG. 1 without departing from the present invention as defined by the appended claims.

The printing system 100 advantageously provides for the printing of digital documents 103 as hardcopy documents 106 while at the same time, detecting the existence of print defects on the hardcopy document 106. The print defects are created, for example, by worn or damaged consumable parts in the printer employed to print the hardcopy document 106. When printing defects are found on a particular hardcopy document 106, the printing system 100 prevents the printing of selected ones of a number of print jobs stored in a printer queue from printing that would be affected by the printing defect.

The printing system 100 includes a printer 109, a printer queue 111, and a defect avoidance system 113. The defect avoidance system 113 includes a scanner 116, a manual defect detector 119, a manual defect plotter 121, an automated defect detector 123, an affected document searcher 126, and a queue reset module 129. The printer 109 may be, for example, a digital offset press, a laser jet printer, ink jet printer or other type of printer with consumable parts, etc.

Next, the operation of the printing system 100 is described. To begin, a digital document 103 that is to be printed is placed in the printer queue 111. The digital document 103 may be, for example, a document created by a word processor or other application as can be appreciated by those with ordinary skill in the art. The printer queue 111 controls the flow of the digital documents 103 to the printer 109 as can be appreciated by those with ordinary skill in the art. When a digital document 103 is placed in the printer queue 111, it can then be selected for printing. When selected for printing, the digital document 103 is applied to the printer 109. The selection of the digital document 103 for printing may be based, for example, on the order that the digital document 103 was received in the printing queue relative to other digital documents 103 or based on some other priority system. The printer 109 then proceeds to print the digital document 103 on an appropriate media, thereby creating a hardcopy document 106. The media may be, for example, paper, transparencies, or other print media or surface structure upon which the digital document may be printed. At the same time, the digital document 103 that is printed may also be temporarily stored for future automated comparison in detecting printing defects as will be discussed.

The printer 109 may include one or more consumable parts that may be worn or damaged, thereby resulting in the appearance of one or more printing defects on the hardcopy document 106. To detect the existence of these printing defects, the hardcopy document 106 is applied to a scanner 116 that generates a digital version of the hardcopy document 106a. It may be possible to substitute some other image generating device in the place of the scanner 116 to generate the digital version of the hardcopy document 106a. The digital version of the hardcopy document 106a may then be applied to an automated defect detector 123 that automatically identifies the printing defects thereon. Those printing defects that are detected by the automated defect detector 123 are recorded in a defect record 139. In detecting the existence of printing defects in the digital version of the hardcopy document 106a, the automated defect detector 123 may compare the digital version of the hardcopy document 106a with the digital document 103 from which the respective hardcopy document 106 was printed.

Alternatively, the digital version of the hardcopy document 106a may be applied to the manual defect detector 119 that also provides for the manual identification of a printing defect on the digital version of the hardcopy document 106a. The manual defect detector 119 accomplishes this, for example, by generating a user interface that facilitates the manual identification by a user of one or more printing defects on the digital version of the hardcopy document 106a. Those printing defects that are identified by the user are then recorded in the defect record 139. Each of the printing defects that are recorded in the defect record 139 may be expressed in terms of an area occupied by the respective printing defect along with coordinates that express the position of the identified area relative to the rest of the digital version of the hardcopy document 106a.

In still another alternative, the manual defect plotter 121 may be employed to generate the defect record 139. The manual defect plotter 121 facilitates the generation of the defect record 139 without the digital version of the hardcopy document 106a. Specifically, the manual defect plotter 121 generates a user interface that displays, for example, the digital document 103. The user interface facilitates the selection of areas on the digital document 103 in which a defect lies, although the defects do not appear on the digital document 103. In such case, a user visually examines the hardcopy document 106 and then identifies an area on the digital document 103 in the user interface within which they believe that the defect is located. Thus, the manual defect plotter 121 provides for a user approximation of areas in which various defects are found. To locate the areas in which defects are found, a user can locate similar text on both the digital document 103 and the hardcopy document 106 to be used as a guide. When all areas have been identified, the manual defect plotter 121 generates the defect record 139 therefrom.

Regardless of how the defect record 139 is created, once complete, it is applied to the affected document searcher 126. The affected document searcher 126 compares the printing defects recorded in the defect record 139 with each of the digital documents 103 that are currently held in the printer queue 111 to ascertain whether any of the digital documents 103 is adversely affected by the printing defects. A digital document 103 may be adversely affected where a printing defect intolerably or unacceptably impairs the printing quality of one or more images on the digital document 103.

Assuming that an image on a particular digital document 103 is adversely affected by a defect, then the affected document searcher 126 will attempt to reposition one or more images in the digital document 103 such that it is no longer affected by the print defect, as will be discussed in greater detail. If successful, then the digital document 103 is returned into the printer queue 111 for printing.

If the one or more adversely affect images in the digital document 103 can not be successfully repositioned, then the affected document searcher 126 prevents the printing of such digital documents 103. This may be done, for example, by associating a hold flag 143 with those digital documents 103 that are adversely affected by at least one of the printing defects. The printer queue 111 overlooks any of the digital documents 103 with the hold flag 143 in selecting digital documents 103 to be sent to the printer 109 for printing.

The queue reset module 129 eliminates the hold flags 143 from the digital documents 103 stored in the printer queue 111 upon an occurrence of a reset condition. A reset condition exists, for example, when a worn or damaged consumable part of the printer 109 is replaced, presumably eliminating any existing print defects. The reset condition may be detected by appropriate sensors or other circuitry or may be triggered by the user by manipulating an appropriate input device associated with the printing system 100 after the suspect consumable part(s) is/are replaced.

Thus as can be seen, the defect avoidance system 113 provides significant advantages in that the printing of digital documents 103 that are adversely impacted by printing defects is avoided. In preventing the printing of such digital documents, unnecessary waste is prevented. At the same time, those digital documents 103 that are not affected by the printing defects can still be printed. Consequently, a maximum amount of use is obtained from worn or damaged consumable parts in the printer 109 before they are replaced. In this respect, the down time of the printing system 100 is minimized.

In addition, a digital document 103 may be configured as a test page that is used to identify printing defects caused by the printer. Such a test page may be comprised of a solid color or solid black or other configuration. The test page is printed as a digital document 103 and is then provided to the defect avoidance system 113 to detect printing defects thereon.

Figure 2:
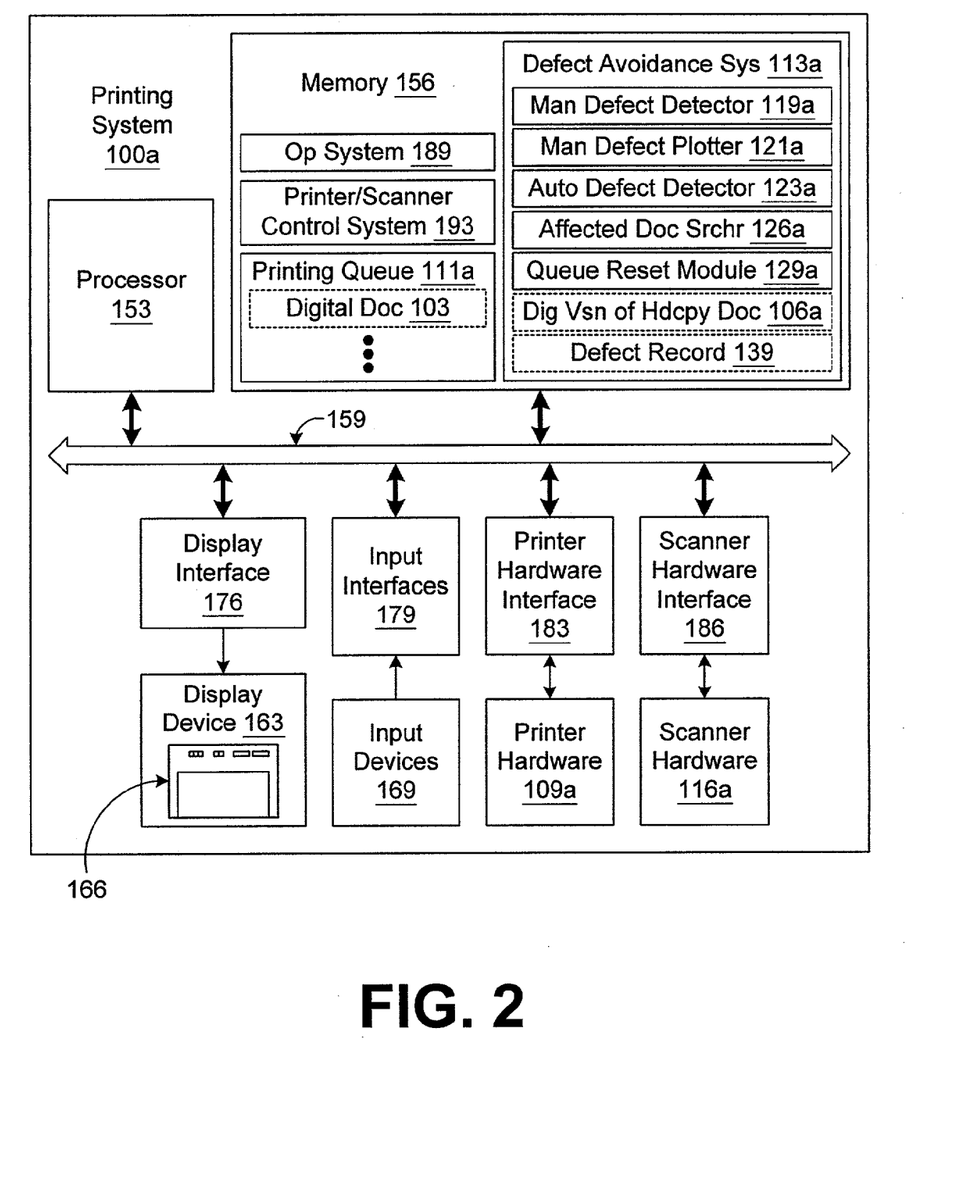
FIG. 2 is a block diagram of one embodiment of the printing system of FIG. 1 according to an embodiment of the present invention.

Referring next to FIG. 2, shown is a printing system 100a according one embodiment of the present invention that provides one example of the printing system 100 (FIG. 1). The printing system 100a includes a processor circuit having a processor 153 and a memory 156, both of which are coupled to a local interface 159. The local interface 159 may be, for example, a data bus with an accompanying control/address bus as can be appreciated by those with ordinary skill in the art. The printing system 100a includes a display device 163 that displays, for example, a user interface 166 or other information, etc. The display device 163 may be, for example, a cathode ray tube (CRT), liquid crystal display screen, gas plasma-based flat panel display, or other type of display device, etc.

The printing system 100a also includes one or more input devices 169, a printer 109a, and a scanner 116a. The display device 163 is coupled to the local interface 159 through a display interface 176. Likewise, the input devices 169 are coupled to the local interface 159 by virtue of input interfaces 179. The input devices 169 may include, for example, a keyboard, keypad, touch pad, touch screen, microphone, mouse, joystick, or one or more push buttons, etc.

The printer 109a may be, for example a laser printer, ink jet printer, or other type of printer. The printer 109a is coupled to the local interface 159 by a printer interface 183. The printer interface 183 may be, for example, a printer interface card or other appropriate interface circuit. Similarly, the scanner 116a or other imaging device is coupled to the local interface 159 by a scanner interface 186 that may comprise an appropriate scanner interface card or other interface circuit, etc.

The printing system 100a includes a number of components that are stored on the memory 156 and are executable or otherwise processable by the processor 153. In this respect, the printing system 100a includes an operating system 189 and a printing queue 111a that may store and track one or more digital documents 103. The printing system 100a includes one embodiment of the defect avoidance system 113a that includes a manual defect detector 119a, a manual defect plotter 121a, an automated defect detector 123a, an affected document searcher 126a, and a queue reset module 129a. The defect avoidance system 113a includes a printer/scanner control system 193 that coordinates the operation of the printer 109a and the scanner 116a in printing the hardcopy document 106 and in generating the digital version of the hardcopy document 106a therefrom. Also, the digital version of the hardcopy document 106a and the defect record 139 may be stored in the memory 156 when created.

The memory 156 is defined herein as both volatile and nonvolatile memory and data storage components. Volatile components are those that do not retain data values upon loss of power. Nonvolatile components are those that retain data upon a loss of power. Thus, the memory 156 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 153 may represent multiple processors and the memory 156 may represent multiple memories that operate in parallel. In such a case, the local interface 159 may be an appropriate network that facilitates communication between any two of the multiple processors, between any processor and any one of the memories, or between any two of the memories etc. The processor 153 may be electrical, molecular, or optical in nature.

In addition, in another embodiment, each of the components that are stored on the memory 156 may be stored and executed in a device that is separate to and in communication with the printing system 100a, etc.

The operating system 189 is executed to control the allocation and usage of hardware resources in the printing system 100a such as the memory, processing time and peripheral devices. In this manner, the operating system 189 serves as the foundation on which applications depend as is generally known by those with ordinary skill in the art.

Figure 3:
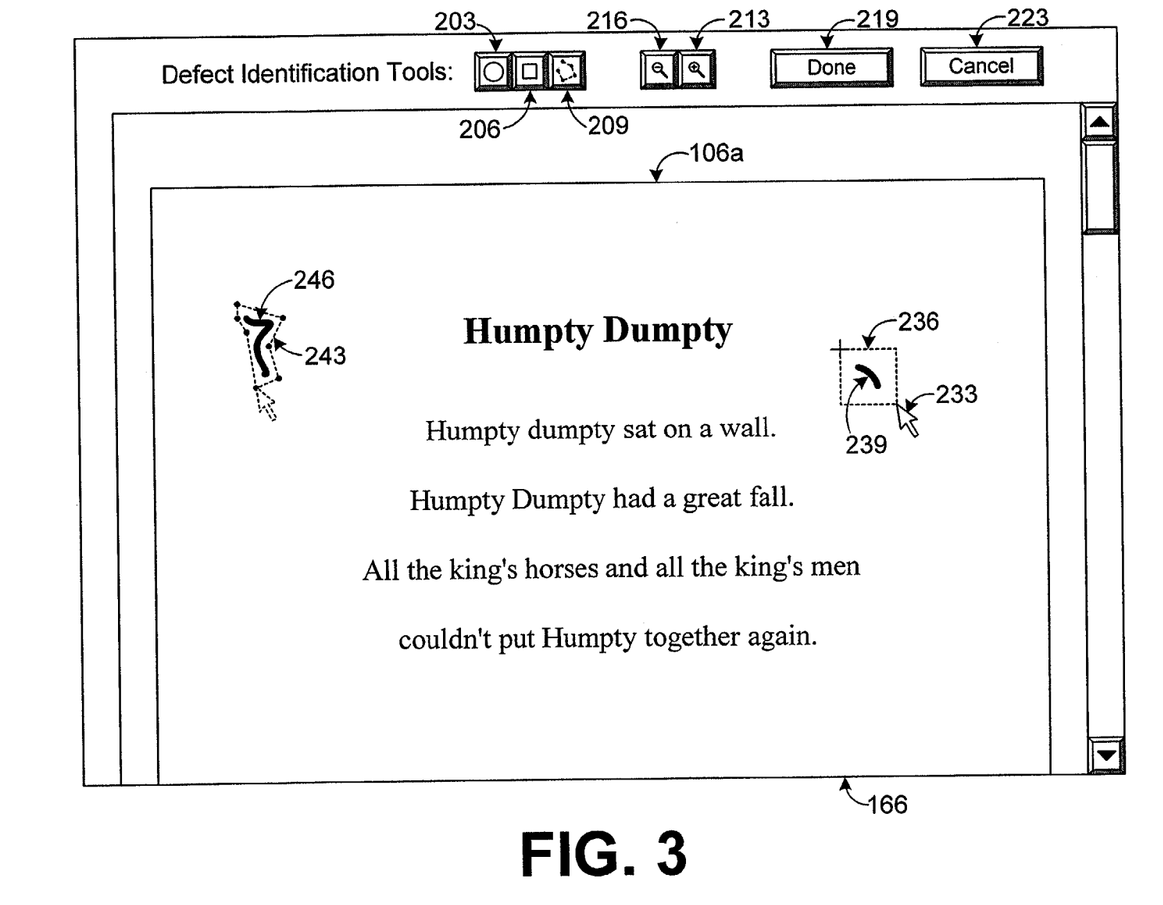
FIG. 3 is a drawing of an exemplary user interface generated by the printing system of FIG. 2 according to an embodiment of the present invention.

Referring next to FIG. 3, shown is an exemplary user interface 166 that may be employed with the manual defect detector 119a to facilitate user identification of the printing defects on the digital version of the hardcopy document 106a (FIG. 1). It is understood that the user interface 166 is merely an example of the multitude of different types of user interfaces that may be employed to accomplish the same task as described herein. In particular, it is noted that other graphical components beyond the buttons and other elements shown with reference to FIG. 3 may be employed in different versions of the user interface 166. Also, other user interfaces beyond graphical user interfaces as depicted in FIG. 3 may be employed.

The user interface 166 depicts the digital version of the hardcopy document 106a that was obtained from the scanner 116 (FIG. 1). The user interface 166 includes a circular defect identification tool 203, a square defect identification tool 206, and a point-to-point defect identification tool 209. The user interface 166 also includes a magnify button 213 and a de-magnify button 216. The user interface 166 also includes a "done" button 219 and a "cancel" button 223. Each of the above mentioned components may be manipulated by positioning a cursor 233 thereon using a mouse or other device and "clicking" thereon by depressing an appropriate button associated with the mouse or by selecting and manipulating such components through some other approach.

For example, by manipulating one of the defect identification tools 203, 206, or 209, the user is provided with a tool that can be used to identify a particular defect on the digital version of the hardcopy document 106a. For example, by clicking on the square defect identification tool 206, the user may draw a square 236 around a print defect 239. Specifically, the square 236 may be created by clicking on a beginning position and dragging the square around the printing defect 239. Likewise, the same may be done with the circular defect identification tool 203.

By clicking on the point-to-point defect identification tool 209, a user may draw a series of lines 243 around a specified print defect 246. Thus, the area defined by any one of the defect identification tools 203, 206, or 209 defines an approximate area occupied by a printing defect. This area may be recorded in the defect record 139. Also, coordinates that define a position of the area on the digital version of the hardcopy document 106a may be recorded in the defect record 139. It is also understood that the printing defects may be manually identified using other approaches described herein. Ultimately, the particular approach employed may be resolved as an implementation issue.

The user may click on the magnify button 213 or the de-magnify button 216 in order to make the digital version of the hardcopy document larger or smaller to help in manually identifying the print defects 239, 246. Additionally, the user may click on the done button 219 in order to submit the defect record 139 to the affected document searcher 126. Alternatively, if the user wishes not to proceed with the identification of printing defects or with submitting the defect record 139 to the affected document searcher 126 (FIG. 1), the user may click on the cancel button 223. Thus, the user interface 166 thus provides for the ability of the user to identify one or more print defects 239, 246 that are to be avoided in future print jobs.

Figure 4:
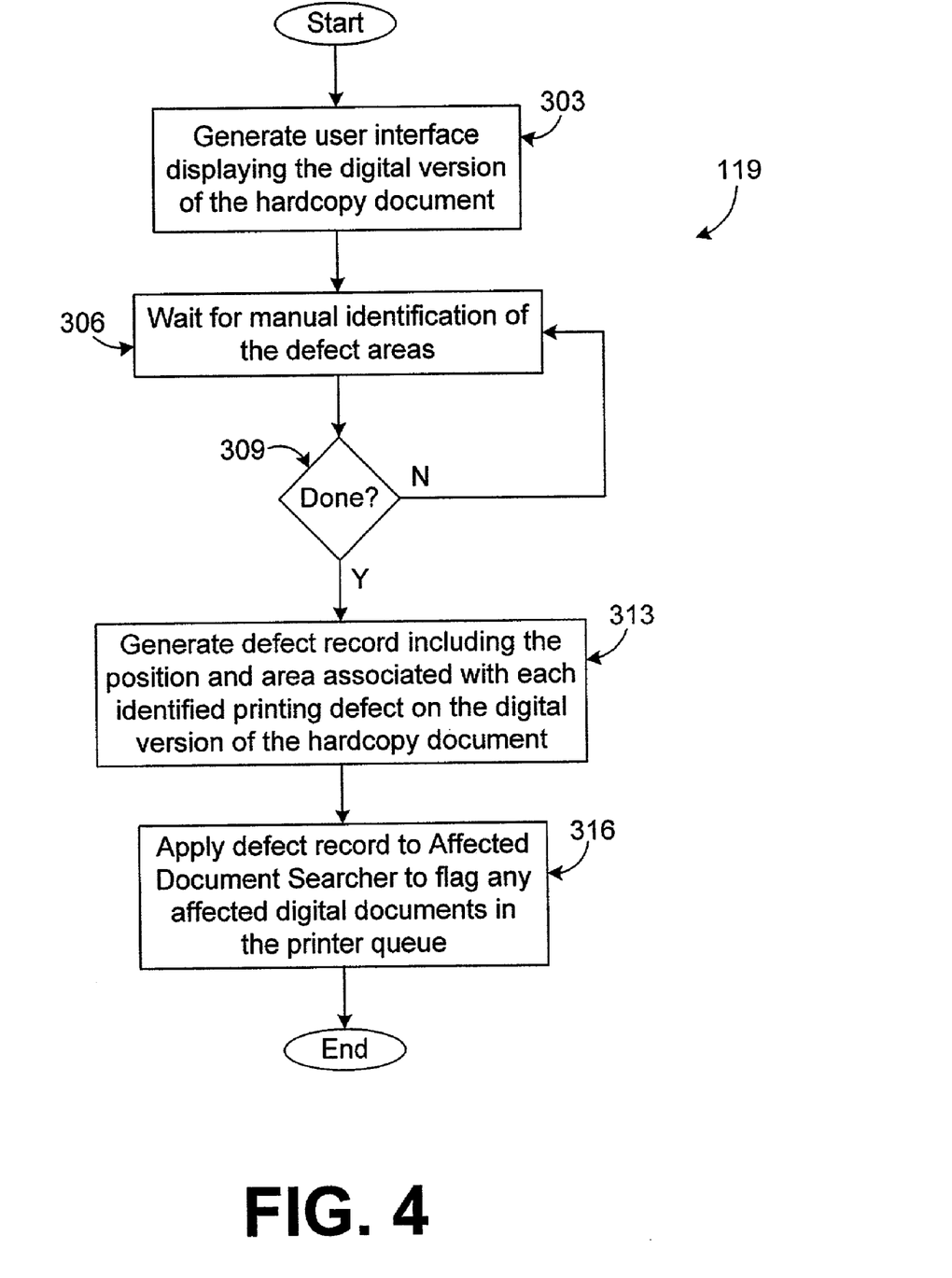
FIG. 4 is a flow chart of an automated defect detector employed in the defect avoidance system of FIG. 1 according to an embodiment of the present invention.

With reference next to FIG. 4, shown is a flow chart that depicts one exemplary implementation of the functionality of the manual defect detector 119 according to an embodiment of the present invention. Alternatively, the flow chart of FIG. 4 may be viewed as depicting steps of a method implemented in the printing system 100 (FIG. 1) to manually identify printing defects on the digital version of the hardcopy document 106a. In addition, it is possible that the same or similar functionality may be depicted in an alternative flow or architecture, such flow or architecture being resolved as an implementation issue.

Beginning with box 303, the manual defect detector 119 first generates the user interface 166 (FIG. 1) to display the digital version of the hardcopy document 106a (FIG. 1). Thereafter, the manual defect detector 119 proceeds to box 306 to wait for the user to manually identify each of the areas on the digital version on the hardcopy document 106a (FIG. 3) that includes a printing defect. Thereafter, in box 309, the manual defect detector 119 determines whether the user has indicated that they have completed identifying the printing defects by clicking on the done button 219 (FIG. 3) or by taking some other appropriate action. Assuming that all of the printing defects have been identified on the digital version of the hardcopy document 106a, then the manual defect detector 119 proceeds to box 313 in which the defect record 139 (FIG. 1) is generated.

In this respect, the defect record 139 comprises a record of each of the areas identified on the digital version of the hardcopy document 106a that contains a printing defect as identified by the respective defect identification tools 203, 206, or 209. In addition, associated with each printing defect is a position relative to the digital version of the hardcopy document 106a. Thereafter, in box 316, the manual defect detector 119 applies the defect record 139 to the affected document searcher 126 to associate a hold flag 143 (FIG. 1) with any digital documents 103 (FIG. 1) in the printer queue 111 (FIG. 1) or otherwise take such steps as are appropriate to prevent the printing of those digital documents 103 that are adversely affected by any of the printer defects noted by the user. Thereafter, the manual defect detector 119 ends.

It is noted that the operation of the manual defect plotter 121 (FIG. 1) is similar to the operation of the manual defect detector 119 with the exception that, for the manual defect plotter 121, in box 303 the digital document 103 (FIG. 1) is displayed in the user interface rather than the digital version of the hardcopy document 106a.

Figure 5:
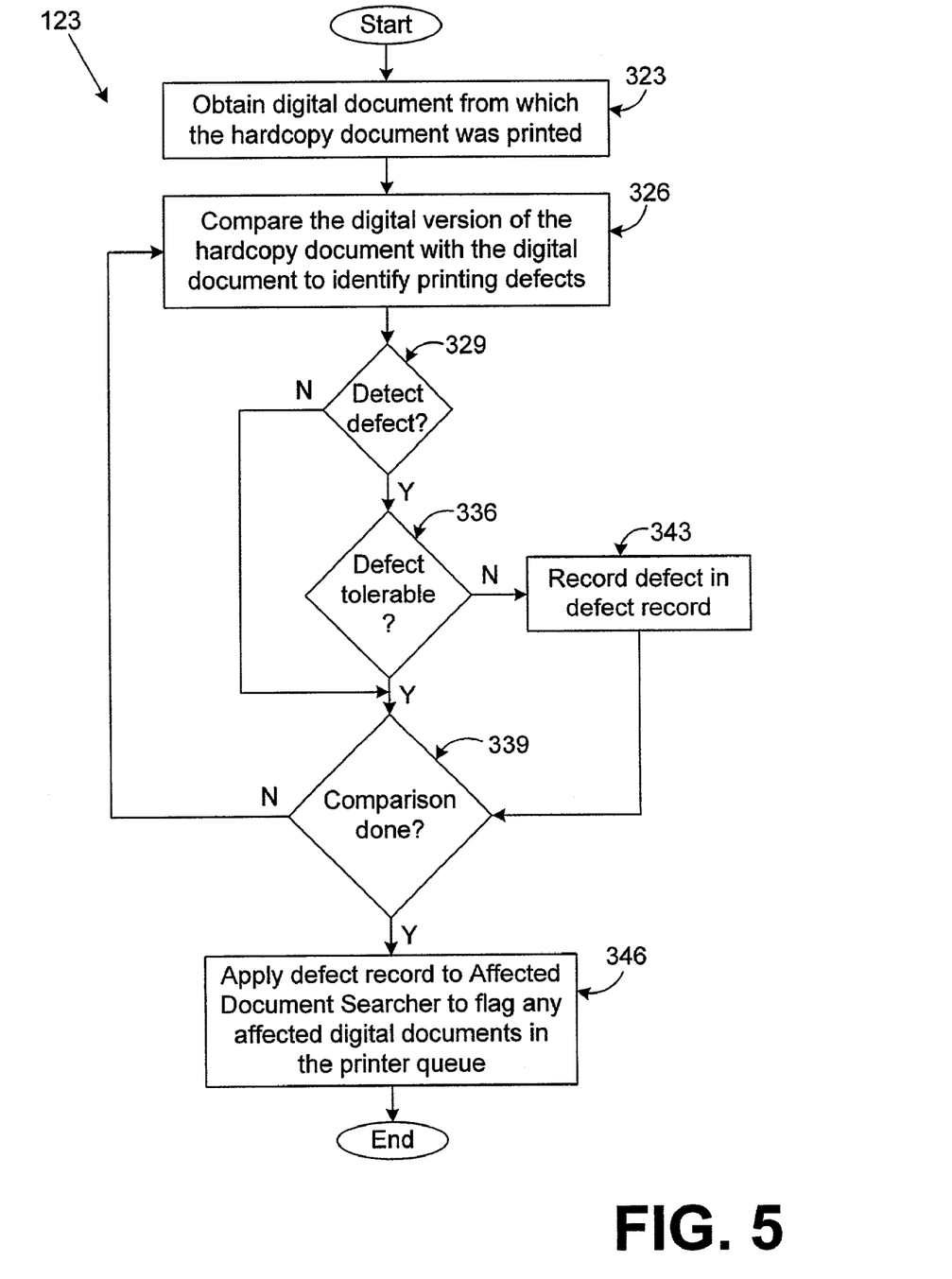
FIG. 5 is a flow chart of a manual defect detector employed in the defect avoidance system of FIG. 1 according to an embodiment of the present invention.

With reference to FIG. 5, shown is a flow chart that depicts one exemplary implementation of the functionality of the automated defect detector 123 according to an embodiment of the present invention. Alternatively, the flow chart of FIG. 5 may be viewed depicting steps implemented in the printing system 100 in automatically detecting printing defects on the digital version of the hardcopy document 106a. In addition, it is possible that the same or similar functionality may be representative in an alternative flow or architecture, such flow or architecture being resolved as an implementation issue.

Beginning with box 323, the automated defect detector 123 obtains a digital document 103 (FIG. 1) from which a current hardcopy document 106 (FIG. 1) was printed that was used to generate a digital version of the hardcopy document 106a (FIG. 1). Such a digital document 103 as a copy or otherwise would be stored, for example, in a memory when chosen for printing from the printer queue 111 (FIG. 1). Thereafter, in box 326, the digital version of the hardcopy document 106a is compared with the original digital document 103 from which the hardcopy document 106 was printed to locate any printing defects thereon. This comparison may be performed on a pixel by pixel basis, a sector by sector basis, where the sectors are predefined areas, or on some other comparison basis. Ultimately, the comparison is performed to find inconsistencies between the digital document 103 and the digital version of the hardcopy 106a that are caused by a worn or damaged consumable part in the printer 109 (FIG.1).

Next, in box 329, the automated defect detector 123 determines whether a defect has been found. If such is the case, then the automated defect detector 123 proceeds to box 336. Otherwise, the automated defect detector 126 proceeds to box 339. In box 336, assuming that a print defect has been found, then the automated defect detector 123 determines whether the printing defect itself can be tolerated or is of such character or magnitude that it cannot be tolerated for the current and/or for future print jobs. This may be determined by consulting a number of defect standards that specifically identify the characteristics of tolerable defects and intolerable defects. For example, the defect standards might specify that any spots resulting from a printing defect that are greater than or equal to a predetermined size and are also darker or equal in darkness to a predetermined darkness threshold are intolerable. The defect standards may also provide for the identification of missing content portions that reach a predetermined size or shape, etc. Note that any variety of defect standards may be applied to make the determination of whether a particular printing defect is tolerable or intolerable in box 336, such standards being resolved as an implementation issue.

Assuming that a defect has been judged intolerable in box 336, then the automated defect detector 123 moves to box 343 in which the printing defect is recorded in the defect record 139 (FIG. 1). The particular parameters that may be recorded in the defect record 139 may include, for example, an area on the digital version of the hardcopy document 106a that is occupied by the printing defect. Also, coordinates may be recorded that provide a position of the area on the digital version of the hardcopy document 106a. Other information about the printing defect may also be recorded in the defect record 139.

Thereafter, the automated defect detector 123 proceeds to box 339. Likewise, if a defect is deemed tolerable in box 336, then the automated defect detector proceeds to box 339. In box 339, the automated defect detector determines whether there remain further portions of the digital version of the hardcopy document 106a to be examined and compared with the same portions of the corresponding digital document 103. If such is the case, then the automated defect detector 123 reverts back to box 326. Otherwise, the automated defect detector 123 proceeds to box 346 in which the defect record 139 is applied to the affected document searcher 126. Thereafter, the automated defect detector 123 ends.

As described above, the automated defect detector 123 creates a single defect record 139 that contains information relating to all of the printing defects discovered on a single digital version of the hardcopy document 106a. However, as an alternative, a number of defect records 139 may be created, each such defect record 139 corresponding to a respective printing defect found on the digital version of the hardcopy document 106a.

Figure 6:
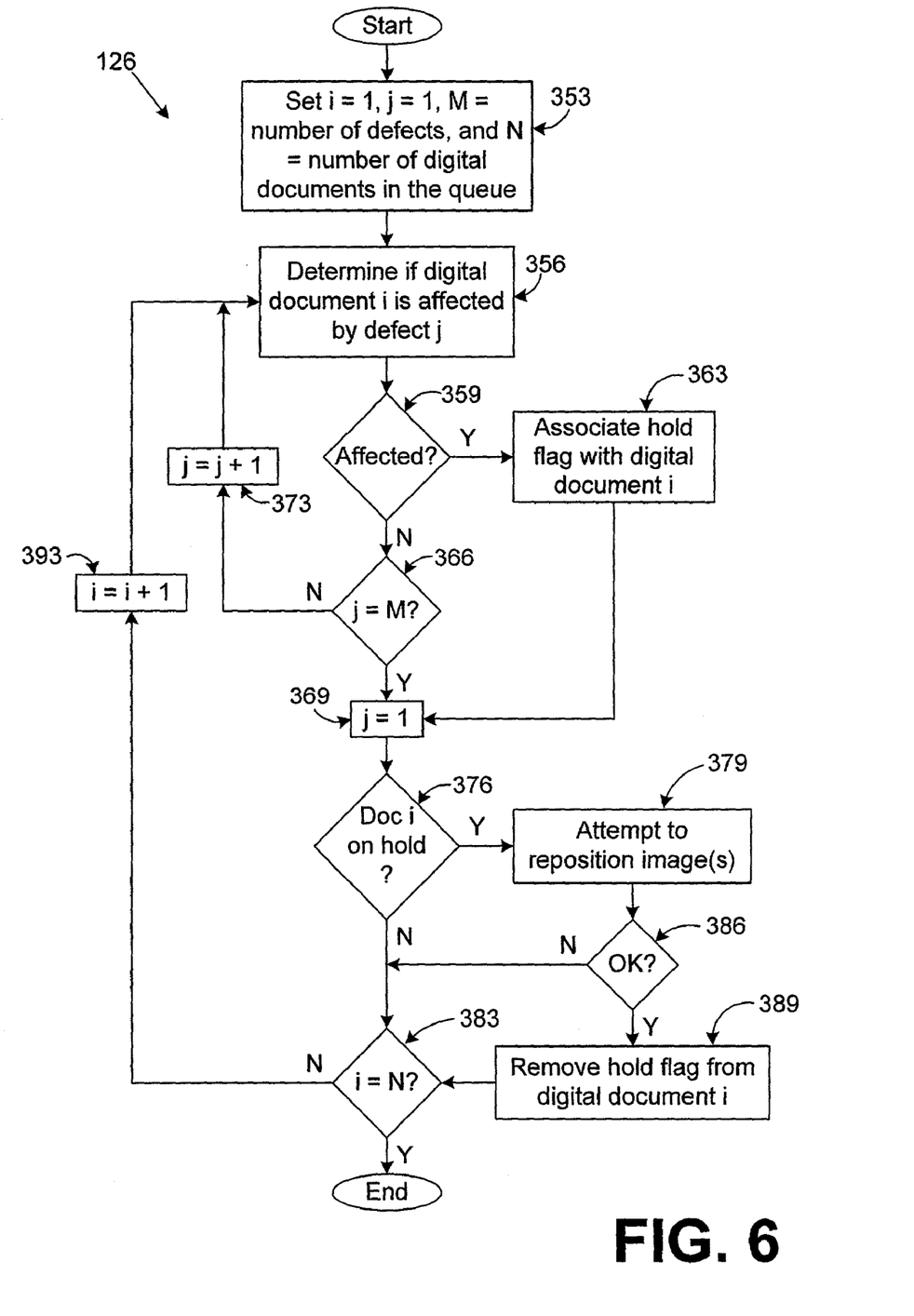
FIG. 6 is a flow chart of an affected document searcher employed in the defect avoidance system of FIG. 1 according to an embodiment of the present invention.

Turning then to FIG. 6, shown is a flow chart of one exemplary implementation of the functionality of the affected document searcher 126 according to an embodiment of the present invention. Alternatively, the flow chart of FIG. 6 may be viewed as depicting steps in a method implemented in the printing system 100 to flag affected ones of the digital documents 103 stored in the printer queue 111 (FIG. 1) that are impacted by any printing defects noted in the defect record 139 (FIG. 1). In addition, it is possible that the same or similar functionality may be depicted in an alternative flow or architecture, such flow or architecture being resolved as an implementation issue.

Beginning with box 353, the affected document searcher 126 defines two loop variables. In this respect, a variable 'M' is set to equal the total number of printing defects recorded in the defect record 139 and a variable N is set equal to a total number of digital documents stored in the printer queue 111. The first loop variable i refers to the number of digital documents stored in the printer queue 111. The second loop variable j is directed towards the number of defects in the defect record 139. Initially, the loop variables i and j are set equal to "1". Thereafter, in box 356, the affected document searcher 126 determines if digital document i has been affected by the printing defect j identified in the defect record 139. If such is the case in box 359, then the affected document searcher 126 proceeds to box 363. Otherwise, the affected document searcher 126 moves to box 366. In box 363, the affected document searcher 126 associates a hold flag 143 (FIG. 1) with digital document i. Alternatively, the affected document searcher 126 may designate the digital document i as being unprintable in some other manner. Thereafter, the affected document searcher 126 proceeds to box 369.

Assuming, however, that the digital document i is not affected in box 359, then the affected document searcher proceeds to box 366 in which it is determined whether the current digital document i has been scrutinized for the existence of the all printing defects recorded in the defect record 139. If such is the case, then the affected document searcher 126 proceeds to box 369. Otherwise the affected document searcher 366 moves to box 373 in which the loop variable j is incremented to test for the next defect. Thereafter, the affected document searcher 126 reverts back to box 356.

Assuming that the affected document searcher 126 has proceeded to box 369, then the loop variable j is set equal to one. Then, in box 376 it is determined whether the current document i is on hold. If such is the case, then the affected document searcher 126 moves to box 379. Otherwise, the affected document searcher 126 proceeds to box 383. In box 379, an attempt is made to reposition or impose the digital document 103 upon a print surface that coincides with a physical sheet. The imposition is done in an attempt to avoid any coincidence between all areas in which the print defects appear and an area of the digital document 103, given all of the print defects noted in the defect record 139 (FIG. 1). To explain further, in some circumstances, a print job such as the digital document 103 is typically trimmed from a physical sheet and some portions of the sheet are wasted. If the images in the digital document 103 may be imposed onto a sheet such that the print defect occurs in a wasted portion of the sheet, then the digital document 103 can still be successfully printed. Imposing a print job or digital document as such may involve rotating the digital document 103 or otherwise positioning the digital document 103 in a new location relative to a physical sheet upon which the digital document 103 is to be printed.

Note that the repositioning of any images in the digital document 103 may be performed automatically or manually. If manual repositioning is employed, then the affected document searcher 126 may generate a user interface that facilitates manual repositioning of one or more images in the digital document to avoid the printing defects.

Once the attempt at repositioning images in box 379 is complete, if the repositioning was successful in box 386, then the affected document searcher 126 proceeds to box 389. Otherwise, the affected document searcher 126 progresses to box 383. In box 389, assuming that repositioning of one or more images in box 379 was successful in preventing the one or more images from being affected by the printing defects, then the hold flag associated with the current document i is removed to allow the document i to be printed. Thereafter, the affected document searcher 126 moves to box 383.

In box 383 the loop variable i is compared with the maximum number of digital documents 103 in the printer queue 111 to determine whether the last digital document 103 has been scrutinized for printing defects by the affected document searcher 126. If such is the case, then the affected document searcher ends. Otherwise, the affected document searcher 126 moves to box 393 in which the loop variable i is incremented. Thereafter, the affected document searcher 126 reverts back to box 356.

In addition, it is understood that for printers that do not allow imposition of a digital document 103 as described above, boxes 376, 379, 386, and 389 may be omitted from the flow chart of FIG. 6.

Figure 7:
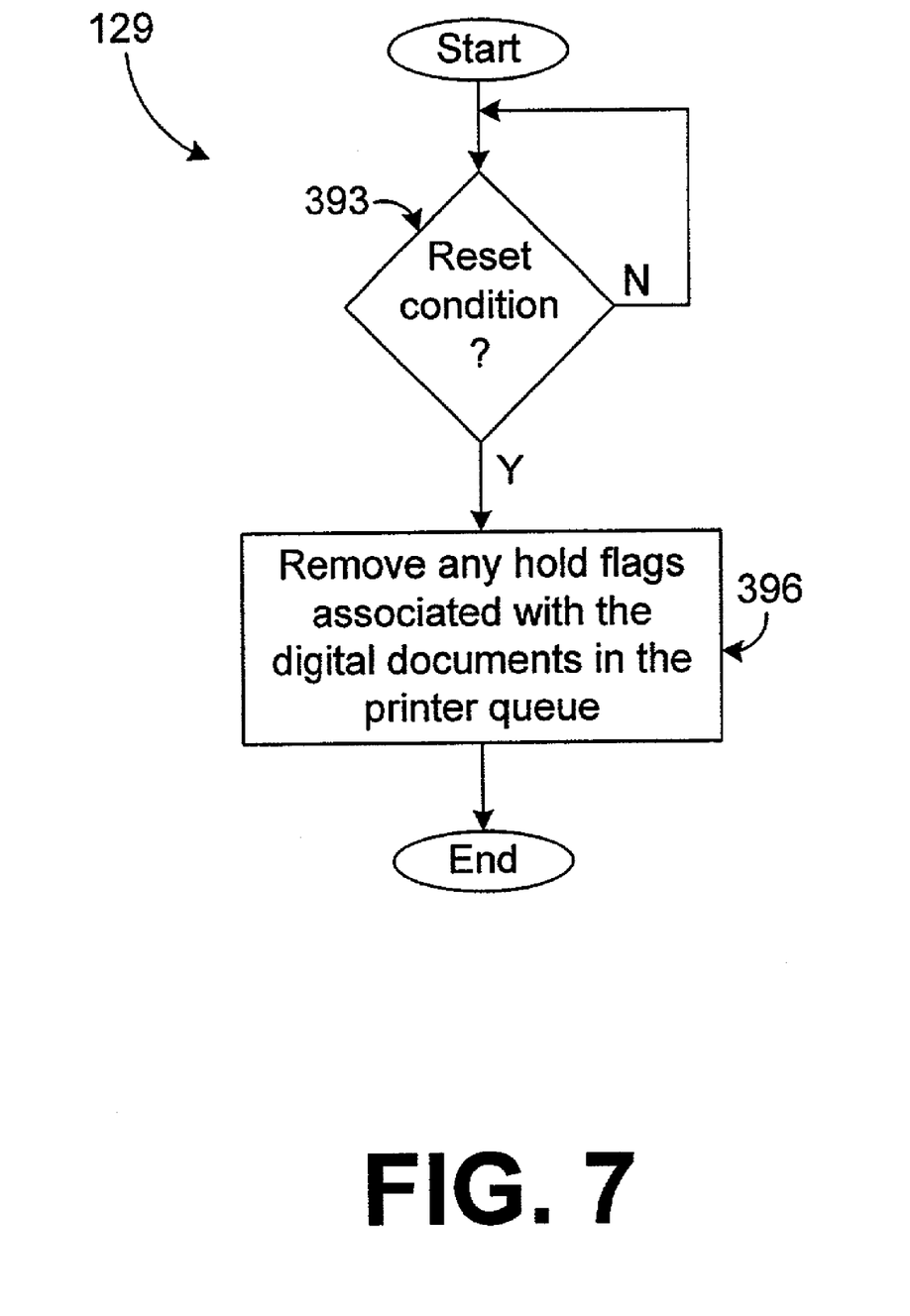
FIG. 7 is a flow chart of a queue reset module employed in the defect avoidance system of FIG. 1 according to an embodiment of the present invention.

Referring next to FIG. 7, shown is a flow chart that depicts one exemplary implementation of the functionality of the queue reset module 129 according to an embodiment of the present invention. Alternatively, the flow chart of FIG. 7 may be viewed as depicting steps in a method implemented in the printing system 100 (FIG. 1) to remove all of the hold flags 143 (FIG. 1) from the various digital documents 103 (FIG. 1) in the printer queue 111 (FIG. 1) upon an occurrence of a reset condition. In addition, it is possible that the same or similar functionality may be depicted in an alternative flow or architecture, such flow or architecture being resolved as an implementation issue.

Beginning with box 393, the queue reset module 129 determines whether a reset condition exists. A reset condition may be, for example, the condition where consumable parts causing printing defects have been either replaced or fixed such that the printing defects may be presumed to be eliminated. The reset condition may be triggered manually by a user by manipulating appropriate input devices 169 (FIG. 2) to indicate that a consumable part of the printer 109 that was causing printing defects has been replaced. Alternatively, appropriate sensors or other circuitry may be employed in the printer 126 to detect the exchange of various consumable parts that may be worn over time or damaged thereby causing the printing defects.

If a reset condition exists in box 393, then the queue reset module 129 proceeds to box 396. In box 396, any hold flags 143 associated with any one of the digital documents 103 stored in the printer queue 111 are removed therefrom. Where some other alternative approach is employed other than the use of hold flags 143, the digital documents 103 are otherwise no longer prevented from being applied to the printer 109 (FIG. 1) by the printer queue 111. As such, the digital documents 103 can now be selected by the printer queue 111 to be applied to the printer 109 for printing as presumably the condition in the printer 109 that had previously resulted in printing defects has been resolved. Thereafter, the queue reset module 129 ends.

Although various components of defect avoidance system 113 are depicted in various examples herein as software or code executed by general purpose hardware as discussed above, as an alternative such components may also be embodied in dedicated hardware or a combination of software/general purpose hardware and dedicated hardware. If embodied in dedicated hardware, such components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams and/or flow charts of FIGS. 1–7 show the architecture, functionality, and operation of an implementation of the defect avoidance system 113 and the various components included therein. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 4–7 show a specific order of execution, it is understood that the order of execution may differ from that which is depicted. For example, the order of execution of two or more blocks may be scrambled relative to the order shown. Also, two or more blocks shown in succession in FIGS. 4–7 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the various components of the defect avoidance system 113 comprise software or code, they can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain any one of the various components of the defect avoidance system 113 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A method for avoiding printing defects, comprising:
    identifying a printing defect on a hardcopy document, the printing defect being created by a printer;
    identifying at least one non-printed digital document affected by the printing defect;
    preventing a printing of the at least one non-printed digital document as long as the at least one non-printed digital document remains affected by the printing defect; and
    attempting to impose the at least one non-printed digital document onto a position on a print surface to avoid a coincidence between an area corresponding to the printing defect on the print surface and an area associated with the non-printed digital document on the print surface, whereby the non-printing digital document is no longer affected by the printing defect.

2. The method of claim 1, further comprising providing a test page as the hardcopy document.

3. The method of claim 1, wherein the identifying of the printing defect on the hardcopy document further comprises:
    generating a digital version of the hardcopy document, the hardcopy document being printed from an original digital document; and
    automatically detecting the printing defect by comparing the digital version of the hardcopy document with the original digital document.

4. The method of claim 3, wherein the automatic detecting of the printing defect by comparing the digital version of the hardcopy document with the digital document further comprises determining whether the printing defect is tolerable as determined by at least one defect standard.

5. The method of claim 1, wherein the identifying of the printing defect on the hardcopy document further comprises providing a user interface that facilitates a manual identification of the printing defect on an original digital document from which the hardcopy document was printed.

6. The method of claim 1, wherein the identifying of the printing defect on the hardcopy document further comprises:
    generating a digital version of the hardcopy document; and
    providing a user interface that facilitates a manual identification of the printing defect on the digital version of the hardcopy document.

7. The method of claim 6, wherein the identifying of the at least one non-printed digital document affected by the printing defect further comprises determining whether the printing defect interferes with a content of the at least one non-printed document.

8. The method of claim 7, wherein the determining of whether the printing defect interferes with the content of the at least one non-printed document further comprises determining whether a position of the printing defect on a digital version of the hardcopy document falls within an area of the content on the nonprinted digital document.

9. The method of claim 1, wherein the preventing of the printing of the at least one non-printed digital document affected by the printing defect further comprises associating a hold flag with the at least one non-printed digital document, wherein the hold flag prevents the at least one non-printed digital document from being printed.

10. The method of claim 1, further comprising providing for a reset condition in which the at least one digital document affected by the printing defect is no longer prevented from being printed.

11. A program embodied in a computer readable medium for avoiding painting defects, comprising:
    code that provides for an identification of a printing defect on a digital version of a hardcopy document, the printing defect being created by a printer;
    code that identifies at least one non-printed digital document in a printer queue affected by the printing defect;
    code that prevents a printing of the at least one non-printed digital document as long as the at least one non-painted digital document remains affected by the printing defect; and
    code that attempts to impose the at least one non-printed digital document onto a position on a print surface to avoid a coincidence between an area corresponding to the printing defect on the print surface and an area associated with the non-printed digital document on the print surface, whereby the non-printed digital document is no longer affected by the printing defect.

12. The program embodied in a computer readable medium of claim 11, wherein the code that provides for the identification of the printing defect on the digital version of the hardcopy document further comprises code that automatically detects the printing defect by comparing the digital version of the hardcopy document with a digital document from which the hardcopy document has been printed.

13. The program embodied in a computer readable medium of claim 12, wherein the code that automatically detects the printing defect by comparing the digital version of the hardcopy document with the digital document further comprises code that determines whether the printing defect is tolerable as determined by at least one defect standard.

14. The program embodied in a computer readable medium of claim 11, wherein the code that provides for the identification of the printing defect on the digital version of the hardcopy document further comprises code that generates a user interface that facilitates a manual identification of the printing defect on the digital version of the hardcopy document.

15. The program embodied in a computer readable medium of claim 14, wherein the code that identifies the at least one non-printed digital document in the printer queue affected by the printing defect further comprises code that determines whether the printing defect interferes with a content of the at least one non-printed document.

16. The program embodied in a computer readable medium of claim 15, wherein the code that determines whether the printing defect interferes with the content of the at least one non-printed document further comprises code that determines whether a position of the printing defect on the digital version of the hardcopy document falls within an area of the content on the non-printed digital document.

17. The program embodied in a computer readable medium of claim 11, wherein the code that prevents the printing of the at least one non-printed digital document affected by the printing defect further comprises code that associates a hold flag with the at least one non-printed digital document that prevents the at least one non-printed digital document from being printed.

18. The program embodied in a computer readable medium of claim 17, further comprising code that removes the hold flag associated with the at least one non-printed digital document upon an occurrence of a reset condition.

19. A system for avoiding printing defects, comprising:
means for identifying a printing defect on a hardcopy document, the printing defect being created by a printer;
means for identifying at least one non-printed digital document affected by the printing defect;
means for preventing a printing of the at least one non-printed digital document as long as the at least one non-printed digital document remains affected by the printing defect; and
means for attempting to impose the at least one non-printed digital document onto a position on a print surface to avoid a coincidence between an area corresponding to the printing defect on the pint surface and an area associated with the non-printed digital document on the print surface, whereby the non-printed digital document is no longer affected by the printing defect.

20. The system of claim 19, wherein the means for identifying the printing defect on the hardcopy document further comprises:
means for generating a digital version of the hardcopy document and
means for automatically detecting the printing defect by comparing the digital version of the hardcopy document with a digital document from which the hardcopy document was printed.

21. The system of claim 19, wherein the means for identifying the printing defect on the hardcopy document further comprises:
means for generating a digital version of the hardcopy document; and
means for providing a user interface that facilitates a manual identification of the printing defect on the digital version of the hardcopy document.

22. The system of claim 21, wherein the means for identifying the at least one non-printed digital document affected by the printing defect further comprises means for determining whether the printing defect interferes with a content of the at least one non-printed document.

23. A system for avoiding printing defects, comprising:
a processor circuit having a processor and a memory;
a defect avoidance system stored in the memory and executable by the processor, the defect avoidance system comprising:
logic that provides for an identification of a printing defect on a digital version of a hardcopy document that was created by a printer;
logic that identifies at least one non-printed digital document in a printer queue affected by the printing defect;
logic that prevents a printing of the at least one non-printed digital document as long as the at least one non-printed digital document remains affected by the printing defect; and
logic that attempts to impose the at least one non-printed digital document onto a position on a print surface to avoid a coincidence between an area corresponding to the printing defect on the print surface and an area associated with the non-printed digital document on the print surface, whereby the non-printed digital document is no longer affected by the printing defect.

24. The system of claim 23, wherein the logic that provides for the identification of the printing defect on the digital version of the hardcopy document further comprises logic that automatically detects the printing defect by comparing the digital version of the hardcopy document with a digital document from which the hardcopy document was printed.

25. The system of claim 23, wherein the logic that provides for the identification of the printing defect on the digital version of the hardcopy document further comprises logic that generates a user interface that facilitates a manual identification of the printing defect on the digital version of the hardcopy document.

26. The system of claim 25, wherein the logic that identifies the at least one non-printed digital document in the printer queue affected by the printing defect further comprises logic that determines whether the printing defect interferes with a content of the at least one non-printed document.

27. A method for avoiding printing defects, comprising:
identifying a printing defect on a hardcopy document, the printing defect being created by a printer;
identifying at least one non-printed digital document affected by the printing defect; and
attempting to impose the at least one non-printed digital document onto a position on a print surface to avoid a coincidence between an area corresponding to the printing defect and an area associated with the non-printed digital document.

28. The method of claim 27, further comprising preventing a printing of the at least one non-printed digital document affected by the printing defect upon a failure to impose the at least one non-printed digital document to avoid the coincidence between the area corresponding to the printing defect and the area coinciding with the non-printed digital document.

29. A program embodied in a computer readable medium for avoiding printing defects, comprising:
- code that identifies a printing defect on a hardcopy document, the printing defect being created by a printer;
- code that identifies at least one non-printed digital document affected by the printing defect; and
- code that attempts to impose the at least one non-printed digital document onto a position on a print surface to avoid a coincidence between an area corresponding to the printing defect and an area associated with the nonprinted digital document.

30. The program embodied in a computer readable medium of claim 29, further comprising code that prevents a printing of the at least one non-printed digital document affected by the printing defect upon a failure to impose the at least one non-printed digital document to avoid the coincidence between the area corresponding to the printing defect and the area corresponding to the non-printed digital document.

31. A system for avoiding printing defects, comprising:
- means for identifying a printing defect on a hardcopy document, the printing defect being created by a printer;
- means for identifying at least one non-printed digital document affected by the printing defect; and
- means for attempting to impose the at least one non-printed digital document onto a position on a print surface to avoid a coincidence between an area corresponding to the printing defect and an area associated with the nonprinted digital document.

32. The system of claim 31, further comprising means for preventing a printing of the at least one non-printed digital document affected by the printing defect upon a failure to impose the at least one non-printed digital document to avoid the coincidence between the area corresponding to the printing defect and the area corresponding to the non-printed digital document.

33. A system for avoiding printing defects, comprising:
- a processor circuit having a processor and a memory;
- a defect avoidance system stored in the memory and executable by the processor, the defect avoidance system comprising:
- logic that identifies a printing defect on a hardcopy document, the printing defect being created by a printer;
- logic that identifies at least one non-printed digital document affected by the printing defect; and
- logic that attempts to impose the at least one non-printed digital document onto a position on a print surface to avoid a coincidence between an area corresponding to the printing defect and an area associated with the non-printed digital document.

34. The system of claim 33, wherein the defect avoidance system further comprises logic that prevents a printing of the at least one non-printed digital document affected by the printing defect upon a failure to impose the at least one non-printed digital document to avoid the coincidence between the area corresponding to the printing defect and the area corresponding to the non-printed digital document.

* * * * *